Dec. 10, 1957 L. E. HUTSON ET AL 2,815,789
NUT RETAINER WHICH IS DISTORTABLE TO
PERMIT ASSEMBLY OF NUT THEREWITH
Filed June 25, 1954

INVENTORS.
LESTER E. HUTSON
MALCOLM V. IMBODEN
HARRY W. STANNARD
BY THEIR ATTORNEYS.
HARRIS, KIECH, FOSTER & HARRIS

2,815,789
NUT RETAINER WHICH IS DISTORTABLE TO PERMIT ASSEMBLY OF NUT THEREWITH

Lester E. Hutson, Los Angeles, Malcolm V. Imboden, Montrose, and Harry W. Stannard, Hollywood, Calif., assignors to Floyd B. Odlum, New York, N. Y.

Application June 25, 1954, Serial No. 439,426

6 Claims. (Cl. 151—41.7)

The present invention relates in general to retainers for nuts, the invention being of particular utility as a floating-nut retainer and being disclosed in such connection herein for convenience, although it will be understood that in some instances the invention may be utilized as a fixed-nut retainer without departing from the spirit thereof.

The primary object of the invention is to provide a nut retainer which, when assembled with a complementary nut, provides extremely high torque-out and push-off resistance, but which is nevertheless light in weight and relatively simple and inexpensive.

Another object is to provide a retainer which is compact as to height and width while still providing maximum nut flotation, the compactness of the retainer as to height providing for maximum accessibility.

Another and important object of the invention is to provide a retainer which may be assembled with a complementary nut very readily, but which prevents disassembly of the nut in normal use.

Another object is to provide a nut retainer having the foregoing features which is formed of a single piece of sheet metal.

Considering the nut retainer of the invention more specifically, an object of the invention is to provide a nut retainer formed of a single piece of resilient sheet metal having a flat central portion provided with a bolt opening, and having portions on opposite sides of such central portion which are deformed upwardly into stiffening ribs of generally U-shaped cross section, the central portion serving as a connecting means for the ribs.

Another object is to provide stiffening ribs which are arcuate, the ribs being concave inwardly with reference to the space therebetween, and terminating at the edges of the retainer, thereby rendering the central portion of the retainer between the ribs unstiffened so that it may flex for a purpose to be described. This is accomplished by making the radius of rib curvature greater than one-half the retainer width.

Another object is to provide the ribs at their centers with nut engaging means, such nut engaging means comprising openings in the ribs for lugs on a nut disposed between the ribs. The distance between the ribs at their centers is less than the distance between the outer ends of the lugs on the nut, the central portion of the retainer being capable of being flexed without permanent deformation, since it is resilient, to increase the spacing between the ribs so that the lugs can be inserted into the lug openings in the ribs, the retainer thereafter snapping back into its original configuration to retain the nut. This provides a very simple means of assembly, which is an important feature of the invention.

Another object in the floating-nut retainer of the invention is to make the distance between the ribs at their centers greater than the distance between the inner ends of the lugs on the nut and to make the lug openings in the ribs wider than the lugs on the nut so as to provide for flotation of the nut.

Another object is to provide means for mounting the nut retainer on a structural element with which it is to be used, comprising tabs integral with and located outwardly of the ribs and having therein fastener openings, such as rivet openings, located in close proximity to the lug openings in the ribs.

Various other objects, advantages and features of the invention will appear hereinafter in connection with the following detailed description of the exemplary embodiment of the invention which is illustrated in the accompanying drawing. Referring to the drawing.

Figure 1:
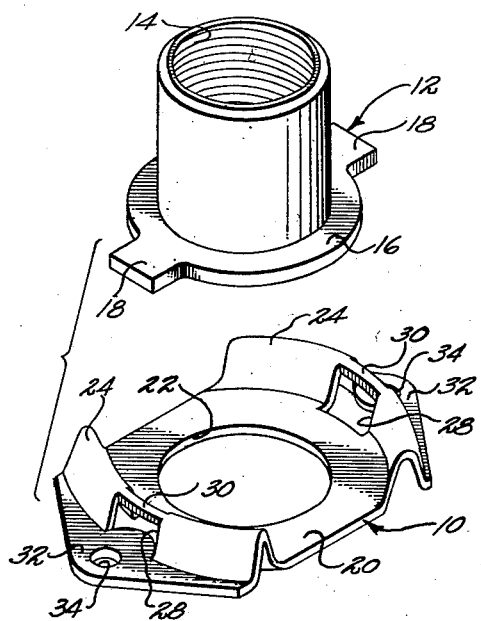
Fig. 1 is an exploded isometric view showing the nut retainer of the invention and a complementary nut in disassembled relation.

The nut retainer of the invention is designated generally by the numeral 10 and is adapted to retain a nut 12 comprising an internally threaded portion 14 shown as cylindrical. The threaded portion 14 of the nut is provided at its lower end with a flat base 16 having lugs 18 projecting therefrom on opposite sides thereof.

The retainer 10 comprises a single piece of sheet metal having a flat, generally annular, central portion 20 provided with a bolt opening 22 therethrough. On opposite sides of the central portion 20 of the retainer 10, the sheet metal is deformed upwardly into ribs 24 of U-shaped cross section, the ribs being arcuate and being concave inwardly with reference to the space between the ribs. The width of the retainer 10 is less than the diameter of the circle defined by the ribs 24 so that at least part of the central portion 20, which forms a connecting means between the ribs 24, is unstiffened by the ribs to render same readily flexible for a purpose to be described.

Figure 2:
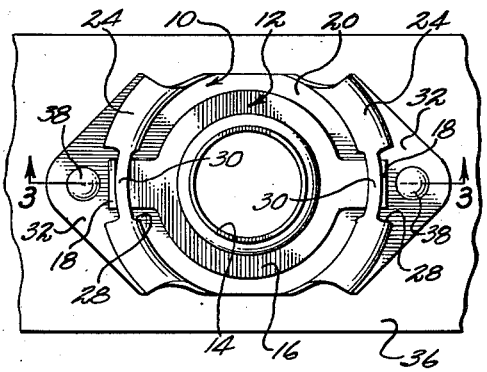
Fig. 2 is a plan view of the nut and nut retainers in assembled relation, with the nut retainer mounted on a structural element with which it is to be used.
Figure 3:
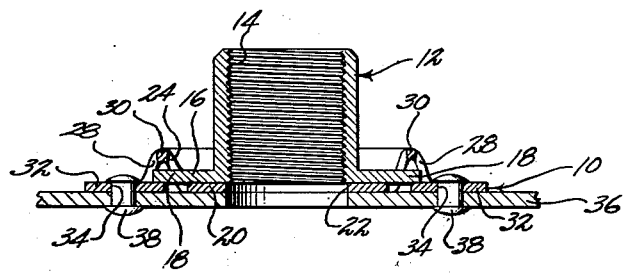
Fig. 3 is a sectional view taken along the arrowed line 3—3 of Fig. 2.

The ribs 24 are provided at their centers with lug openings 28 therethrough, the lug openings being bridged over by portions 30 of the ribs. The lugs 18 on the nut 12 are insertable into the lug openings 28 in a manner hereinafter described. Integral with the ribs 24 and located outwardly thereof are tabs 32 having fastener holes 34 therein to serve as mounting means for mounting the retainer on a structural element 36, for example. In the particular construction illustrated, rivets 38 extend through the fastener holes 34 to secure the retainer 10 to the structural element 36. As best shown in Figs. 2 and 3 of the drawing, the fastener holes 34 are located in close proximity to the ribs 24, preferably at least substantially tangent to the ribs.

After forming, the retainer 10 is heat treated to spring temper to render it resilient so that it may be flexed without permanent deformation, the retainer being capable of being flexed transversely thereof intermediate the ribs 24 to increase the spacing between the lug openings 28. Normally, the spacing between the lug openings 28 is less than the spacing between the outer ends of the lugs 18 on the nut 12 to prevent disengagement of the nut from the retainer 10. By flexing, i. e., bowing, the unstiffened central portion 20 of the retainer, the spacing between the ribs 24 at the lug openings 28 therein may be increased to a value such that after inserting one of the lugs 18 on the nut 12 into one of the lug openings 28, the other lug on the nut may be inserted into the other lug opening. Thereafter, the retainer 10 is allowed to snap back to its original configuration, which provides a very simple means of assembling the nut 12 with the retainer.

As best shown in Fig. 2 of the drawing, the spacing between the ribs 24 at their centers is greater than the spacing between the inner ends of the lugs 18, and the lug openings 28 are wider than the lugs 18, thereby permitting floating movement of the nut 12 relative to the retainer 10 for misalignment compensation as is well known in the floating-nut art. However, the invention may be embodied in a fixed-nut, or nonfloating-nut retainer, if desired. It will be noted that any desired degree of nut flotation may be obtained by simply varying the spacing of the ribs 24 and the widths of the lug openings 28 in the ribs, a high degree of nut flotation being attainable with a very compact retainer 10.

The nut retainer 10 provides extremely high torque-out and push-off resistance when assembled with the nut 12, due to the provision of the ribs 24 and the location of the fastener holes 34 relative thereto. Considering the push-off resistance provided, i. e., the resistance to displacement of the nut 12 by axial bolt movement, any axial loads applied to the nut 12 are transmitted to the ribs 24 on opposite sides of the lug openings 28 and thence to the closely adjacent rivets 38, the structure of the retainer 10 in these areas being very rigid to provide maximum push-off resistance. High torque-out resistance is also provided by the ribs 24 having the lug openings 28 therein. As torque is applied to the nut 12, the two lugs 18 contact the edges of the lug openings 28 and the loads thus imposed are transmitted in shear directly to the adjacent rivets 38, thereby providing a direct, low deformation means of load transfer. Generally speaking, the nut retainer 10 of the invention provides a high degree of general rigidity under any type of loading because of the fact that the ribs 24 are strategically located directly in the path of any load transfer between the nut 10 and the rivets 38.

Another feature of the invention is that the retainer 10, being heat treated to spring temper, is of the necessary strength and toughness to permit the use of a relatively thin gauge material to attain an extremely light weight structure, in addition to providing the advantages in assembly hereinbefore noted.

Although we have disclosed an exemplary embodiment of our invention herein for purposes of illustration, it will be understood that various changes, modifications and substitutions may be incorporated in such embodiment without departing from the spirit of the invention as defined by the claims hereinafter appearing.

We claim as our invention:

1. A nut retainer for a nut having lugs on opposite sides thereof, said nut retainer comprising a single piece of resilient sheet metal having a flat central portion provided with a bolt opening and having portions on opposite sides of said central portion deformed into ribs of generally U-shaped cross section, said ribs being provided with lug openings therein at their centers and being spaced apart a distance less than the distance between the outer ends of the lugs on the nut, said flat central portion being capable of being flexed to increase the distance between the centers of said ribs so as to provide for insertion of the lugs on the nut into said lug openings, respectively, said retainer including tabs located outwardly of and integral with said ribs, said tabs having fastener openings therein in close proximity to said lug openings and substantially tangent to said ribs, said ribs being arcuate and being concave inwardly with reference to the space therebetween, the radius of curvature of said ribs being greater than one-half of the width of said retainer.

2. In a nut retainer for a nut having lugs on opposite sides thereof, the combination of: two spaced ribs adapted to receive the nut therebetween and providing lug openings adapted to receive the lugs on the nut, the distance between said ribs at said lug openings therein being less than the distance between the outer ends of the lugs on the nut, said ribs being arcuate and being concave inwardly with respect to the space therebetween, the radius of curvature of said ribs exceeding one-half of the width of said retainer; resilient connecting means inwardly of and interconnecting said ribs and providing a bolt opening, said resilient connecting means providing for flexure of said nut retainer to increase the distance between said ribs at said lug openings to provide for insertion of the lugs on the nut into said lug openings, respectively; and tabs outwardly of said ribs, said tabs having therein fastener openings substantially tangent to said ribs, respectively, and in close proximity to said lug openings, respectively.

3. In a nut retainer for a nut having two diametrically opposed,, radially outwardly extending lugs thereon, the combination of: two diametrically opposed, spaced ribs adapted to receive the nut therebetween and respectively provided therein with lug openings respectively adapted to receive the lugs on the nut, the distance between said ribs at said lug openings therein being less than the distance between the outer ends of the lugs on the nut, said ribs being nonlinear and being concave inwardly with respect to the space therebetween, the centers of concavity of said ribs being located between said ribs and the center of concavity of each rib being spaced therefrom a distance equal to at least one-half of the width of said retainer; and resilient connecting means between and interconnecting said ribs and providing a bolt opening, said resilient connecting means providing for flexure of said nut retainer to increase the distance between said ribs at said lug openings therein to provide for insertion of the lugs on the nut into said lug openings.

4. In a nut retainer for a nut having two diametrically opposed, radially outwardly extending lugs thereon, the combination of: two diametrically opposed, spaced ribs adapted to receive the nut therebetween and respectively provided therein with lug openings respectively adapted to receive the lugs on the nut, the distance between said ribs at said lug openings therein being less than the distance between the outer ends of the lugs on the nut, said ribs being arcuate and being concave inwardly with respect to the space therebetween, the centers of curvature of said ribs coinciding and being located midway between said ribs, and said ribs being substantially U-shaped in cross section and each having radially spaced inner and outer walls; and resilient connecting means between and interconnecting said ribs and providing a bolt opening having a center which coincides with said coinciding centers of curvature of said ribs, said resilient connecting means providing for flexure of said nut retainer to increase the distance between said ribs at said lug openings therein to provide for insertion of the lugs on the nut into said lug openings.

5. A nut retainer according to claim 4 wherein said lug openings extend through said inner and outer walls of said ribs.

6. A nut retainer as defined in claim 4 wherein said ribs have chordally opposed ends which are spaced apart by said resilient connecting means so that said resilient connecting means forms the sole connection between said ribs.

References Cited in the file of this patent

UNITED STATES PATENTS

| 1,732,992 | Spiro | Oct. 22, 1929 |
| 2,243,923 | Swanstrom | June 3, 1941 |
| 2,353,252 | Leisure | July 11, 1944 |
| 2,421,201 | Hallock | May 27, 1947 |
| 2,443,752 | Tinnerman | June 22, 1948 |
| 2,491,451 | Johnson | Dec. 13, 1949 |
| 2,648,516 | Manetti | Aug. 11, 1953 |

FOREIGN PATENTS

| 483,089 | Great Britain | Apr. 12, 1938 |
| 1,052,272 | France | Sept. 23, 1953 |